Nov. 27, 1956  H. E. STOVER  2,772,013
CLOSURE CAP FOR GLASS CONTAINERS AND METHOD OF MAKING
Filed Dec. 14, 1953
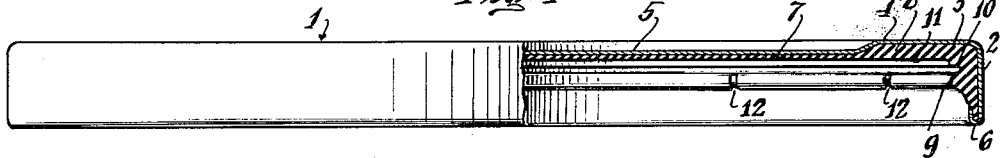
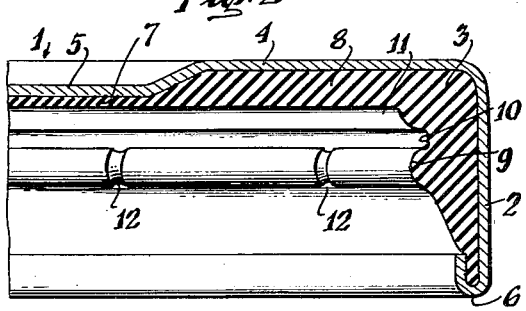
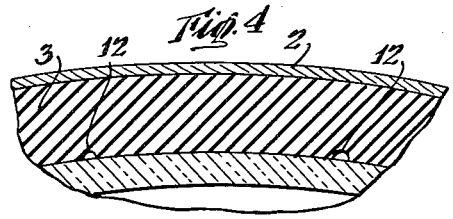
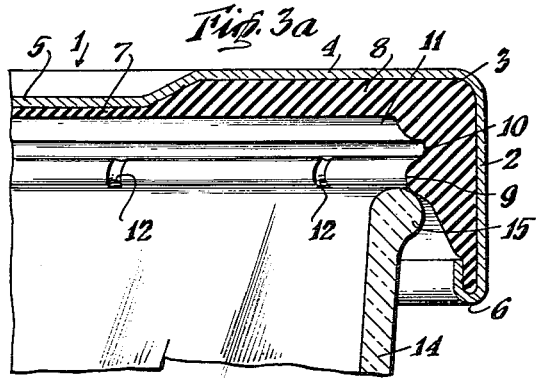
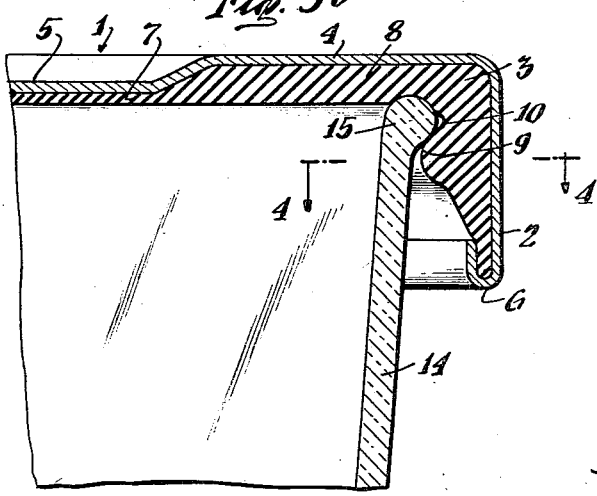
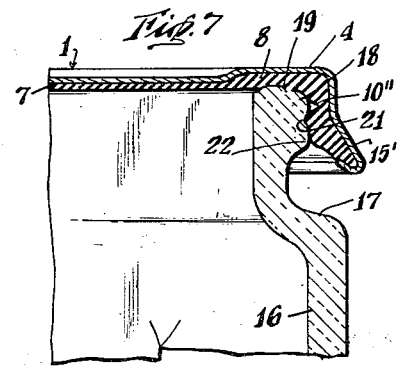
INVENTOR.
Harry E. Stover
BY
ATTORNEY.

United States Patent Office 2,772,013
Patented Nov. 27, 1956

2,772,013

CLOSURE CAP FOR GLASS CONTAINERS AND METHOD OF MAKING

Harry E. Stover, Lancaster, Ohio, assignor to Anchor Hocking Glass Corporation, Lancaster, Ohio, a corporation of Delaware Application December 14, 1953, Serial No. 397,878

2 Claims. (Cl. 215—40)

The present invention relates to the sealing art and more particularly to a closure for making a hermetic seal on a glass container and to the method of making the closure.

More particularly, the invention is an improvement upon the closure of the Harold L. Crabtree application, Serial No. 225,494, filed in the United States Patent Office on May 10, 1951, owned by the assignee of the present application.

The improved closure of the present invention has a greater holding power, and hence, is less likely to come off the container in shipment and handling. In addition, the closure is easier to apply and remove and will automatically relieve any pressure which may build up in the container. For example, hypochlorite solutions, coffee, and a number of other products give off gases and build up pressure after being sealed. Pressure also results from cooking or sterilizing food products after they are sealed in containers.

The present practice in packing most food products is first to fill the container with a fully or partially cooked product and then hermetically seal a closure on it. Generally, the head space between the closure and the product is filled with steam at the time of the sealing to form a partial vacuum within the container by the condensation of the steam after sealing. The sealed containers are then placed in retorts where the temperature is raised sufficiently high to sterilize the contents by killing bacteria and spores. During the sterilizing operation, pressure builds up in the container and unless counteracted by pressure on the outside of the container or by the holding power of the closure sealed to the container, the closure will blow off. Usually, the problem is solved (1) by creating a partial vacuum within the container to minimize the internal pressure; (2) by maintaining a pressure within the retort sufficiently high to counterbalance any pressure which builds up within the sealed containers; and (3) by having closures with a relatively high holding power, or as termed in the art, seals with a high blow-off pressure. Further, the temperature within the containers must be reduced before the containers are removed from the retort. Otherwise, the closure will blow off when the external pressure thereon is reduced. That is, and has been for a generation, a difficult problem for packers and for closure manufacturers.

The present closure, in addition to forming a more secure seal with a greater holding power, automatically relieves such internal pressures, thus permitting sterilization of sealed packages at temperatures above or below the boiling temperatures of the product sealed without requiring counterbalancing external pressures. In other words, the sterilization may be performed at atmospheric pressures.

Since the present closure automatically relieves internal pressures, it is not necessary to vacuumize the head space at the time of sealing. Hence, simple sealing machines without vapor or vacuum forming equipment may be used in sealing the closure. The steam formed within the container during sterilization will drive out any air therein, thus producing a high vacuum within the package without requiring the usual elaborate sealing equipment for producing a vacuum within the container at the time of sealing. The housewife in home canning may force the closure on the container by hand and sterilize or cook the product by placing the containers in pressure cookers without danger of packages exploding due to steam pressure within them.

With certain types of products, such as coffee, the trapped gases escape from the produce during storage and build up pressure within the package. The present closure relieves such pressures.

In packing pickles, for example, they are blanched in a brine solution at 180 to 200° F. for about thirty minutes to remove the air within them. The blanching causes the pickles to shrivel and produces a less crisp and an inferior product. With the present closure, the blanching operation may be eliminated by removing the air during sterilization after the pickles have been sealed in the containers.

An object of the present invention is to provide an improved closure which will form a secure hermetic seal.

Another object of the present invention is to provide a secure hermetic seal with a high blow-off pressure.

Another object of the invention is to provide a hermetically sealed closure which may be readily removed from a container.

Another object of the invention is to provide a hermetically sealed closure which may be easily re-sealed on the container during consumption of the product.

Another object of the invention is to provide an improved closure which will relieve excess pressure within the container.

Another object of the invention is to provide an improved closure which will relieve excess pressure within the container and which will also retain a hermetic seal to exclude entrance of air or bacteria.

Another object of the invention is to simplify the sealing machinery by eliminating the necessity for vapor and vacuum equipment in the sealing operation.

Another object of the invention is to permit simplification of the equipment utilized for sterilizing sealed containers.

Another object of the invention is to provide a closure which forms a vacuum within the container during the sterilization of the contents.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a side view, partly in section, of a closure illustrating a preferred embodiment of the invention;

Fig. 2 is an enlarged fragmentary sectional view of a portion of the closure shown in Fig. 1;

Fig. 3a is a fragmentary sectional view of a portion of a closure and preferred container finish showing the relation of the parts as the closure is forced on a container;

Fig. 3b is similar to Fig. 3a, showing the relation of the parts with the closure sealed on the container;

Fig. 4 is a fragmentary sectional view of a sealed package along the line 4—4 of Fig. 3b, the closure being shown sealed to the glass finish;

Fig. 5 is an enlarged fragmentary sectional view of a modified form of the closure in which the annular groove is at the junction of the skirt and cover part of the cap;

Fig. 6 is an enlarged fragmentary sectional view illustrating another embodiment of the invention; and Fig. 7 is an enlarged fragmentary view of a sealed container showing the preferred embodiment of glass finish for sealing the closure illustrated in Fig. 6.

Referring again to the drawings, and more particularly to Figs. 1 and 2 thereof illustrating a preferred embodiment of the invention, there is shown a closure cap having a cover portion 1, and a depending skirt 2 formed from sheet metal, and a sealing gasket 3 bonded thereto.

The cover part of the closure is preferably provided with an annular peripheral channel 4 adjoining the top of the skirt of the cap provided by depressing the center part, as shown at 5. The skirt 2 in the preferred embodiment is substantially cylindrical with the edge turned in at 6 to envelop the lower edge of the gasket 3.

The gasket preferably comprises a very thin center portion 7 providing a skin-like covering for the underside of the depressed panel 5 of the cover and a thicker portion at 8 filling the peripheral channel 4 and having its lower surface flush with the surface of the gasket under the depressed panel. The portion of the gasket covering the skirt is preferably thicker at its upper part as shown at 9, with an annular groove 10 formed therein. Preferably, the annular groove is spaced slightly below the sealing surface of the gasket on the underside of the cover, as shown at 11. The portion of the gasket below the thickened portion 9 is thinned out for the remainder of the skirt as it does not engage the sealing surface of the container. The lower edge of the cap 6 is turned upwardly to envelop and enclose the lower edge of the gasket. The thickened portion of the gasket below the annular groove 10 is preferably provided with at least one, and preferably several, vertical grooves 12 for relieving pressure which may build up within the container.

While the closure may be applied to different types of containers and to different glass finishes thereon, preferably the closure is applied to a container 14 having a slight enlargement 15 adjacent its rim. When the closure is applied to such a container, the annular enlargement engages the enlarged portion 9 of the gasket and is telescoped over it so that the maximum diameter of the enlargement is substantially medially disposed with respect to the annular groove 10 in the gasket. The upper side of the groove engages on the upper side of the enlargement of the container to cooperate with the rim of the container and the lower surface of the thickened portion 9 of the gasket in the channel 4 to provide a secure seal.

In the preferred embodiment, at least one, and preferably several, vertical grooves extend upwardly over the thickened portion of the gasket below the annular groove 10 and lead to that groove. These grooves, which will be termed vertical grooves in contrast to the annular groove although they may be at an angle, are partially closed by the sealing operation and by the compression of the lower thickened part of the gasket. However, when pressure forms within the container, the cap tends to rise, and in doing so, the enlarged part of the gasket below the annular groove 10 therein and below the enlargement 15 on the container, tends to ride over the enlargement on the container. In addition, the portion of the gasket above the annular groove rises slightly from the rim of the container and enough to permit air or vapor to pass over the top of the rim of the container. The upward movement of the closure also opens to a slight extent the vertical grooves 12 and permits the air to escape. In this way, the closure serves as a check valve, permitting pressure to be relieved from the head space of the container and preventing air from entering the container.

The grooves, as shown in Fig. 2, are exaggerated in size for illustrative purposes. When the closure is sealed as shown in Fig. 4, the compression of the rubber partially closes the vertical grooves. While the vertical grooves are primarily for venting purposes, they also facilitate application and removal by making it easier for the rim of the container to pass through the thick portion of the gasket below the annular groove 10.

The closure, shown in Fig. 5, illustrates another embodiment of the invention and differs from the closure shown in Fig. 1 primarily in the position of the annular groove 10'. For convenience, the parts which are alike have been given similar numbers and those which have been changed have been given the same number with the addition of a prime.

In Fig. 5 the groove 10' is formed at the junction of the skirt of the closure. When the closure is applied to a container, such as the one illustrated in Fig. 3, the container in passing through the lower thickened portion 9 of the gasket forces the gasket up into the groove, stretching the gasket upwardly, and substantially closing the annular groove. In other words, the width of the annular groove is greatly reduced. The groove facilitates application of the closure to a container, and in addition forms a more secure hold upon the enlargement on the container. While good results can be obtained with this closure, the embodiment illustrated in Fig. 1 is preferred. The function of the vertical grooves 12 is the same as in the preferred embodiment and the operation is substantially the same as described in that embodiment.

Another embodiment of the invention is illustrated in Fig. 6. The closure differs from the one illustrated in Fig. 5 primarily in the shape of the groove and skirt. The annular groove 10", is substantially V-shaped and slightly below the junction of the cover on the inside thereof. The skirt 2" of the cap is flared outwardly from about the middle downward as shown at 15'. The outward flare of the skirt facilitates application to a container and also facilitates removal by making it easier to insert an opener or a coin under the bottom of the skirt to pry the closure off. Vertical venting grooves, similar to those shown at 12 in Fig. 2, for example, have not been included in this embodiment, although such grooves may be added if desired. The omission of the grooves is to emphasize that the embodiments of the closure, including those shown in the preceding figures, may be utilized without the vertical venting grooves to provide improved hermetic seals on containers. While the venting grooves are preferred, as pointed out above, excellent results may be obtained without them, and the present invention embodies, and the claims cover, the improved closures and packages with and without the vertical venting grooves.

While various types of containers may be sealed with the closure illustrated in Fig. 6 as well as with the other closures illustrated herein, a preferred embodiment of a jar 16 is illustrated in Fig. 7. The rim 19 of the jar has an annular raised portion which improves the top seal and a peripheral bead 18 corresponding to the bead 15 in Figs. 3a and 3b. An annular groove 21 extends below the bead on the finish, leading to the lower part 22 of the finish which is substantially the same diameter as the maximum diameter of the bead 18. When the closure shown in Fig. 6 is applied to the finish, the annular groove 10" embraces the bead 18 with the lower portion 9" of the gasket below the groove fitting under the bead and into the groove 21. The depth of the groove determines the distance which the portion 9" of the gasket may project inwardly. By having the groove relatively shallow the enlarged portion of the gasket is prevented from extending too far under the bead 18 and thus prevents too much of an interlock between the bead and the gasket.

The cap will snap on and snap off quite readily, which is a feature much desired by both the packer and the housewife. The cap may be readily removed by inserting a coin between the shoulder 17 on the container and the bottom of the skirt to pry the closure off the container.

In the preferred method claimed herein the metal blanks for the closures are stamped with the usual stamping machines. The rubber is applied to the closures by the method shown in the Crabtree application Serial No. 225,494. The method there described utilizes a piece of unvulcanized rubber-like material of proper size which is placed within the metal blank. A die is forced down on the material to cause the rubber-like material to flow between the die and the closure to form the gasket. Simultaneously the lower edge of the cap is turned inwardly, as shown at 6, to envelop the lower edge of the gasket. Preferably in this operation the gasket is formed without the annular groove 10 and without the vertical grooves 12 leading thereto. The latter are formed as a third step by a suitable rolling machine which may receive the partially-formed closures directly from the machine which molds the gaskets therein. The machine has one or more rollers with peripheries shaped to form the grooves in the gasket and rolls the annular groove 10 in the unvulcanized gasket and the vertical grooves 12 at the same time. Thereafter, the closures may be, and preferably are, passed through an oven where they are vulcanized to the proper hardness. It has been found that heating the closures at a temperature of about 285° F. for about thirty minutes produces excellent results.

It will be seen that the present closure provides a secure hermetic seal. Any pressure developing within the container is automatically relieved so that the closure acts more or less as a check valve. The closure may be applied with very simple sealing machines without the vapor or steam attachments required for forming a vacuum within the container. Any air compressed within the head space at the time of sealing is automatically relieved and any pressure formed within the container by liberation of gas by the product during sterilization of the product will also be automatically relieved. Due to the interlocking action of the bead on the container and the annular groove in the closure gasket, the closure goes on and comes off with a snap, which is much desired by the packer and by the housewife. The closure is easily manufactured, simple in operation, and fully capable of providing a secure hermetic seal for an indefinite period of time.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A sheet metal closure cap of the class described comprising a top portion and a depending cylindrical skirt, a rubber compound forming an imperforate covering over the entire inner walls of said top portion and depending skirt, said covering having its greatest thickness along the upper portion of the skirt for telescoping over and engaging the side wall of a container, the inner surface of the covering along the lower portion of the skirt flaring downwardly, said covering having an annular groove in said upper portion adapted to receive an annular enlargement on said container, and a lower edge portion of said skirt extending inwardly and upwardly about the lower edge portion of the covering enveloping and concealing said lower edge portion of the covering.

2. A closure cap as defined in claim 1 with at least one groove in the gasket leading upward to and terminating at the annular groove therein for relieving pressure within the container.

References Cited in the file of this patent

UNITED STATES PATENTS

| | | |
|---|---|---|
| 1,322,914 | Lorenz | Nov. 25, 1919 |
| 1,956,012 | Egan | Apr. 24, 1934 |
| 2,181,799 | Carvalho | Nov. 28, 1939 |
| 2,437,515 | Glocker | Mar. 9, 1948 |
| 2,453,664 | Hohl | Nov. 9, 1948 |
| 2,492,144 | Gora | Dec. 27, 1949 |
| 2,543,775 | Gora | Mar. 6, 1951 |
| 2,620,938 | Jesnig | Dec. 9, 1952 |
| 2,663,909 | Maier et al. | Dec. 29, 1953 |

FOREIGN PATENTS

| | | |
|---|---|---|
| 544,271 | Great Britain | Apr. 3, 1942 |